Aug. 10, 1937.    W. DÄLLENBACH    2,089,542
ELECTRIC VACUUM DISCHARGE APPARATUS
Filed Nov. 21, 1934

INVENTOR:
Walter Dällenbach
BY:
Bailey & Larson
HIS ATTORNEYS.

Patented Aug. 10, 1937

2,089,542

UNITED STATES PATENT OFFICE 2,089,542

ELECTRIC VACUUM-DISCHARGE APPARATUS

Walter Dällenbach, Berlin-Charlottenburg, Germany

Application November 21, 1934, Serial No. 754,071
In Germany July 13, 1931

8 Claims. (Cl. 250—27.5)

My invention relates to metallic vacuum vessels which are liquid cooled and relates particularly to metallic vacuum vessels with liquid cooling for vacuum discharge apparatus having mercury cathodes or incandescent cathodes, e. g., mercury vapor rectifiers. Investigations of the gases which are released during the operation of such apparatus have yielded the result that in vessels which are completely vacuum-tight and which have been de-gassed at high temperatures large quantities of hydrogen are released in the vacuum. It was found that this hydrogen is derived from the cooling water. The operation is as follows:

With increase in temperature the quantity of free hydrogen ions present in the cooling water increases. To a certain extent the water is dissociated into H- and OH-ions. The H-ions or H-atoms have the property of diffusing through iron, steel and most of the ordinary iron alloys used in technology and pass through the walls of the water jacket into the vacuum chamber as hydrogen gas. This gradual deterioration of the vacuum due to the penetration of the hydrogen has hitherto made it impossible to operate continuously vacuum discharge apparatus with a metallic vacuum vessel without employing a pump to restore the vacuum and in addition it results in striking back. This striking back occurs more frequently the higher the temperature of the vessel and the longer the apparatus is operated without interruption. Duration of operation and increasing temperature operate in the same way and result in an increase of hydrogen in the interior of the walls of the apparatus. An appreciable deterioration of the vacuum is not of necessity associated therewith because the hydrogen passing into the vacuum is ionized by the discharge and is driven back to or into the walls. However, this participation in the discharge has the result that not only the parts directly cooled by the water but also all parts bounding the vacuum chamber, and the electrodes for example, are charged with hydrogen. As soon as the electric discharge is suspended for a short period there is a sudden deterioration of the vacuum. This rapid deterioration is caused above all by the hot metal components and particularly by the anodes because the hydrogen is given off from metals in the vacuum more readily and rapidly, the higher the temperature of the metals. With longer duration of operation at full load the charging with hydrogen can increase to such an extent that finally even during the rectifying interval of an anode during which no current is passed, a material quantity of hydrogen emerges from the anode and causes striking back due to rapid deterioration of the vacuum in the vicinity of the anode.

It is well known that the avoidance of the occurrence of such disturbances is one of the main problems in the construction of vacuum discharge apparatus, such as rectifiers for example.

Now the main object of my invention is to provide means which are adapted to ensure that hydrogen ions cannot diffuse through the walls of the vessel or at the most can diffuse through only to a small extent so that no large collection of hydrogen can occur in the vacuum vessel so as to endanger the operation. With this object in view I provide between the interior of the vacuum vessel and the cooling liquid a continuous surface consisting of a material which at the most can take up free hydrogen ions to a very small extent only.

The restriction of the travel of the hydrogen ions is preferably such that at least as much hydrogen escapes through the outer surface of the vacuum chamber into the atmosphere as the vessel takes up from the surrounding parts and particularly from the cooling liquid.

By this systematic restriction of the travel of the hydrogen ions which is now performed for the first time I attain that no deterioration of the vacuum can arise which would be liable to affect the operation detrimentally. As has been shown by experiment, the vacuum discharge apparatus can in consequence be operated continuously without a pump, assuming that the vacuum vessel is non-porous and has been de-gassed at high temperature.

A further feature of my invention resides in that separate chambers are provided for the cooling liquid and the walls of these chambers, insofar as they are in intimate metallic contact with the walls of the vacuum vessel, consist of a material through which hydrogen ions will not diffuse, or which, if it takes up or absorbs hydrogen ions at all, does so, at the most, to an extremely small extent.

Zinc, aluminum and chromium come into consideration by way of example as materials which do not take up hydrogen ions at all or take them up only to a very small degree when in contact with the cooling water and thus are well suited to constitute the liquid cooled portions of the walls. Iron, when it is alloyed with a sufficiently high percentage of one or more of these metals, can also be used. Experiments have shown that an addition of 1% of chromium reduces the absorptive capacity of the walls to about 1/100 of that of pure iron. The permeability can be reduced further in a corresponding manner by increasing the chromium content.

Further features and advantages of my invention are disclosed in the following description as well as in the appended drawing which shows two embodiments of the invention by way of example.

Figure 1:
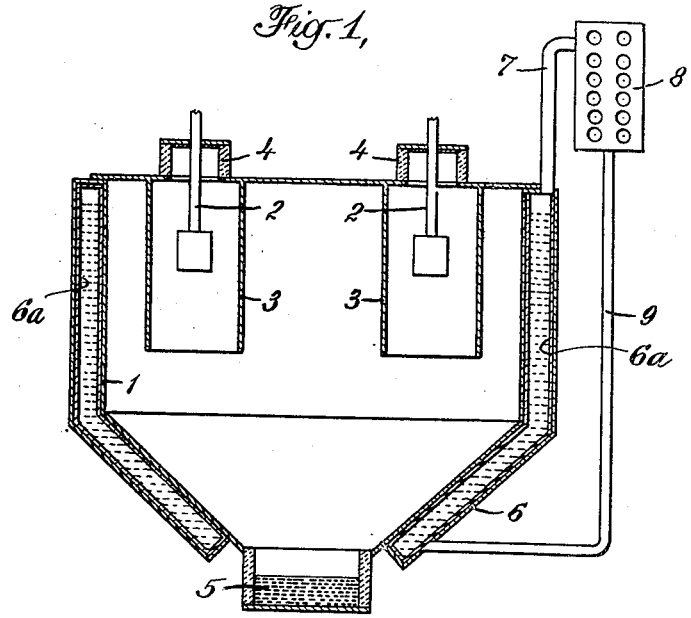
Fig. 1 shows a rectifier the walls of the vacuum vessel of which consist of a material which takes up free hydrogen ions only to a very small extent, if at all.

1 is the vacuum vessel, 2 the anodes which are surrounded by the anode sleeves 3 and are introduced through lead-in elements 4, and 5 is the cathode. The vacuum vessel 1 is enclosed in a cooling jacket 6 which contains a cooling medium. This cooling medium is re-cooled in known manner in a condenser 8 into which the vapor passes through the conduit 7. After the cooling operation, the cooling liquid flows back to the cooling chamber 6 through the conduit 9. The manner in which the liquid is re-cooled is immaterial to the present invention.

Now in order to prevent the penetration of free hydrogen ions into the interior of the vacuum vessel, the walls thereof consist of chrome-iron or other suitable metal which can only take up hydrogen ions to a very small extent, if at all.

In this way it is possible to cut off the rectifier from the vacuum pump entirely and to operate it continuously without subsequent use of a vacuum pump, because a deterioration of the vacuum can no longer occur, assuming of course that the vacuum vessel itself is absolutely tight to high vacua at all points.

A further group of precautions which has already been mentioned resides in that when water is used and the walls of the vacuum vessels are made of a material such as unalloyed iron or steel, which takes up hydrogen ions when immersed in water, the cooling liquid circulates in separate chambers, the walls of which insofar as they are in intimate contact with the walls of the vacuum vessel are of the kind which either do not take up hydrogen ions from the cooling liquid at all or do so only to a sufficiently reduced extent. By intimate metallic contact is meant any irreleasable metallic connection such as welding or soldering. It has been found that the hydrogen diffuses over an ordinary connection and travels large distances in connected metallic parts.

The separate chambers for the cooling liquid can be made of a material such as aluminum, zinc or chromium, which do not take up any hydrogen ions. For example coiled pipes of zinc, aluminum or chromium can be used.

Figure 2:
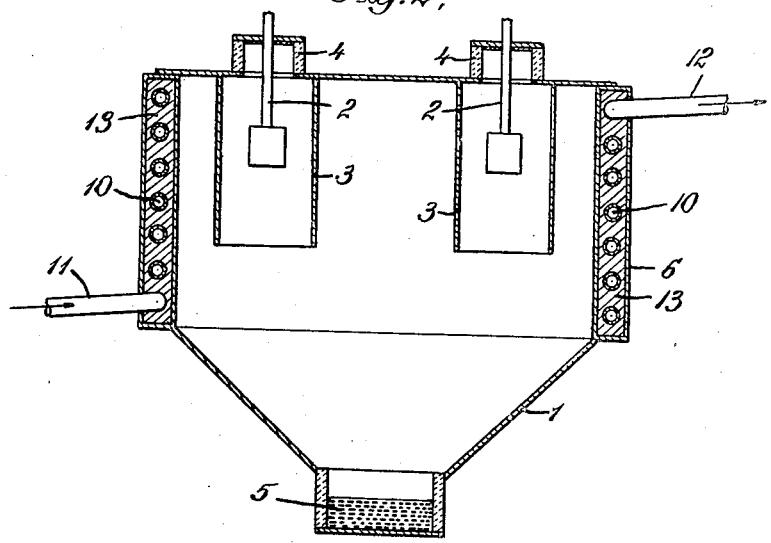
Fig. 2 shows a rectifier in which separate cooling chambers are provided for the cooling liquid, the walls of said cooling chambers consisting of a material which takes up free hydrogen ions only to a very small extent, if at all.

One embodiment of such a cooling arrangement is shown in Fig. 2. Cooling pipes 10 of aluminum, zinc or chromium are accommodated in the cooling chamber enclosed by the outer wall 6. The water serving as cooling liquid is fed in through the conduit 11 and passes out through the conduit 12. The part 13 of the cooling chamber which is not occupied by the pipes 10 is filled by casting in tin for example. In this way an intimate metallic contact is afforded between the walls of the vessel and the cooling pipes 10 which take up no hydrogen ions.

A further solution to the problem resides in furnishing the walls of the vacuum vessel or of the cooling chambers, insofar as they are in intimate metallic contact with the walls of the vacuum vessel 1, with a vacuum tight coating 6a of a material such as aluminum, zinc, chromium, enamel, lacquer or the like material which takes up no hydrogen ions from the cooling liquid.

For the rest this can be put into practice in precisely the manner shown in the cooling arrangements of Fig. 1 or Fig. 2. In the latter case pipes of iron or the like with a vacuum-tight coating are used instead of the cooling pipes of aluminum.

It is to be noted that the customary coatings to prevent rusting are in no way vacuum tight. Consequently it is necessary to prepare special vacuum tight coatings with extreme care as the purpose of the invention can only be attained in this way.

Furthermore the experiments which have been made have demonstrated that the taking up or not of hydrogen ions by a metallic wall from distilled water or from water from the mains is determined by what occurs in the boundary surface between the water and the metal. Hydrogen ions can also travel in the interior of so-called non-absorptive metals such as zinc if they are introduced in a forced manner for example by ionization of the hydrogen in a gas discharge; such metals, however, cannot take up any hydrogen from the water without the use of additional electrical energy. This affords the advantage that any hydrogen which may be present within the vessel is gradually driven out through the walls of the vessel whereas fresh hydrogen cannot penetrate. The taking up of the hydrogen into the interior of the metal is undoubtedly the result of electrolytic actions at the boundary surface. This point of view is also supported by the fact that a metal such as copper which in itself has but small capacity for absorption exhibits a considerable capacity if its surface is not sufficiently clean.

Thus it follows that the outer surface must be kept clean as impurities result in an increased capacity for taking up hydrogen.

My invention is not to be regarded as limited to the examples disclosed but includes also all embodiments operating on the same principle.

I claim:

1. A structure having in combination a permanently hermetically sealed pumpless vacuum vessel comprising an electric vacuum discharge apparatus, and having at least one anode and a cathode, a cooling chamber enclosing a part of the wall portions of the vessel, a cooling fluid contained in said chamber, the surfaces of said wall portions contacting said fluid being composed of a material which is substantially non-absorptive of free hydrogen ions emitted by said fluid, the material of the other surfaces of said vessel being pervious to the outward passage of free hydrogen ions under the action of the electric discharge in said vessel.

2. A structure having in combination a permanently hermetically sealed pumpless vacuum vessel comprising an electric vacuum discharge apparatus, and having at least one anode and a cathode, a cooling jacket for said vessel, a cooling fluid contained between said vessel and jacket, the surfaces of said vessel in contact with said fluid being of a metal substantially non-absorptive of free hydrogen ions emitted by said fluid, the material of the other surfaces of said vessel being pervious to the outward passage of free hydrogen ions under the action of the electric discharge in said vessel.

3. A structure as in claim 2 in which said metal is of a group consisting of zinc, aluminum, chromium and a metal alloyed with zinc, aluminum or chromium.

4. A structure as in claim 2 in which said metal is of a group consisting of zinc, aluminum, chromium and iron alloyed with zinc, aluminum or chromium.

5. A structure having in combination a permanently hermetically sealed pumpless vacuum vessel comprising an electric vacuum discharge apparatus, and having at least one anode and a cathode, a cooling jacket for a part of said vessel, a lining for said jacket and contacting the walls of said vessel, a cooling fluid in said chamber, said fluid contacting said lining, the surface of said lining consisting of a material which is substantially non-absorptive of free hydrogen ions emitted by said fluid, the material of the other surfaces of said vessel being pervious to the outward passage of free hydrogen ions under the action of the electric discharge.

6. A structure as in claim 5 in which said lining is a metal of a group consisting of zinc, aluminum, chromium and a metal alloyed with zinc, aluminum or chromium.

7. A structure having in combination a permanently hermetically sealed pumpless vacuum vessel comprising an electric vacuum discharge apparatus, and having anodes and a cathode, a cooling jacket for a part of said vessel, cooling pipes in said jacket, a cooling fluid in said pipes, a filling of thermal conductive material between said pipes and said jacket, the surfaces of said pipes being composed of a material substantially non-absorptive of free hydrogen ions emitted by said cooling fluid.

8. A structure as in claim 7, in which said material of said pipes is of a group consisting of aluminum, zinc, chromium, and a metal alloyed with aluminum, zinc or chromium.

WALTER DÄLLENBACH.